(12) United States Patent
Nagumo et al.

(10) Patent No.: US 6,189,494 B1
(45) Date of Patent: Feb. 20, 2001

(54) EXHAUST TIMING CONTROL APPARATUS FOR TWO-CYCLE ENGINES

(75) Inventors: Noboru Nagumo; Toshihiro Nagano; Kentaro Hirota, all of Tokyo (JP)

(73) Assignee: Fuji Jukogyo Kabushiki Kaisha, Tokyo (JP)

( * ) Notice: Under 35 U.S.C. 154(b), the term of this patent shall be extended for 0 days.

(21) Appl. No.: 09/311,304

(22) Filed: May 14, 1999

(30) Foreign Application Priority Data

| May 14, 1998 | (JP) | 10-132271 |
| Jul. 22, 1998 | (JP) | 10-206874 |
| Aug. 20, 1998 | (JP) | 10-234517 |
| Aug. 20, 1998 | (JP) | 10-234518 |

(51) Int. Cl.$^7$ .................................................. F02B 75/02
(52) U.S. Cl. ......................................................... 123/65 PE
(58) Field of Search ................................ 123/65 PE, 323

(56) References Cited

U.S. PATENT DOCUMENTS 4,399,788   8/1983   Bostelmann .

FOREIGN PATENT DOCUMENTS

| 3 735 319 | * | 12/1988 | (DE) . |
| 0 205 415 | * | 4/1986 | (EP) . |
| 8-177502 | | 7/1998 | (JP) . |

* cited by examiner

*Primary Examiner*—Noah P. Kamen
(74) *Attorney, Agent, or Firm*—Smith, Gambrell & Russell, LLP (57) ABSTRACT

When an engine is operated at a low and medium speed range, since the combustion pressure introduced into a pressure chamber of a valve drive unit is relatively small, a control valve is projected toward the cylinder by the biasing force of a spring so as to lower the upper edge of the exhaust port. At the same time, in conjunction with this motion of the control valve, a resonance chamber is opened so as to communicate between the resonance chamber and the exhaust port, thereby the engine power is increased. When the engine is operated at a high speed range, since the combustion pressure is relatively large, the control valve goes away from the cylinder so as to enlarge the exhaust port and at the same time, in conjunction with this motion of the control valve, the resonance chamber is closed, thereby the engine power is increased.

14 Claims, 7 Drawing Sheets

FIG.8

EXHAUST TIMING CONTROL APPARATUS FOR TWO-CYCLE ENGINES

BACKGROUND OF THE INVENTION

1. Field of the Invention

The present invention relates to an apparatus for controlling the exhaust timing of a two-cycle engine and more specifically to an apparatus for changing the exhaust timing of the exhaust port by use of a control valve.

2. Prior Art

It is well known that the exhaust timing of two-cycle engines is always constant with respect to the crank angle because the exhaust port is opened and closed by the reciprocating motion of the piston itself. Therefore, the engine, if its exhaust port timing is tuned such that a large power is obtained at high engine speeds, has a tendency to cause so-called "short-circuiting" phenomena in which part of mixture gas straightly goes through the cylinder and is discharged from the exhaust port at low engine speeds due to a relatively elongated opening and closing timing of the exhaust port. On the contrary, in case where the exhaust port timing is adjusted such that a smooth driveability is obtained at low engine speeds, the engine power goes down at high speed ranges due to the decreased exhaust efficiency.

To solve this problem with two-cycle engines, miscellaneous techniques have been proposed in which the exhaust timing is positively controlled so as to obtain a stable power over a wide range of the engine speed. In Japanese Patent Application Laid-open No. Toku-Kai-Hei 8-177502, the applicant of the present invention discloses a technique in which a control valve moves slidably up and down along the exhaust port and more in detail, a control surface formed at the tip of the control valve moves up and down along the exhaust port with a minimum gap retained so that the short-circuiting from the edges of the exhaust port and the control surface is prevented.

The exhaust timing control is not an adequate means to raise the engine power. For example, there is a known technology in which a resonance chamber is provided at the exhaust port in addition to the control valve. In this technology, the resonance chamber is constituted to open at low engine speeds to enhance the engine power by the exhaust resonance effect and to close at high engine speeds to prevent the power reduction.

However, the problem of this technology is that the exhaust timing control and the opening and closing control of the resonance chamber must be performed separately from each other, this resulting in making the control complicated and increasing the number of components.

Further, with respect to the exhaust timing control apparatus, there is a technique in which the control valve has a forward and backward motion by a diaphragm secured to a shaft of the control valve. The diaphragm has a pressure chamber on the opposite side of the control valve, into which an exhaust pressure is introduced. When the engine is operated at low speeds, since the exhaust pressure is relatively low, the control valve is moved forward so as to restrict the exhaust port, i.e., to lower the upper edge of the exhaust port and when the engine is operated at high speeds, since the exhaust pressure is relatively high, the control valve is moved backward so as to open the exhaust port, i.e., to raise the upper edge of the exhaust port.

This type of the exhaust timing control apparatus has a problem that the exhaust pressure is generally low and therefore enough pressure to operate the control valve can not be obtained particularly at low and medium speeds of the engine.

SUMMARY OF THE INVENTION

It is therefore a primary object of the present invention to provide an exhaust timing control apparatus of a two-cycle engine having a simple construction and capable of enhancing the engine power over the wide range of the engine speeds. It is a further object of the present invention to provide an exhaust timing control apparatus which can be operated under a high pressure without gas leakage.

To attain the object, according to a first aspect of the present invention, an exhaust timing control apparatus for a two-cycle engine comprises a valve accommodating section obliquely provided in the cylinder block, a control valve inserted into the valve accommodating section and slidably moving forward and backward along a sliding surface thereof, a cavity provided on the sliding surface, a resonance chamber provided in the vicinity of the valve accommodating section, and a means for communicating between the exhaust port and the resonance chamber through the cavity when the control valve moves forward and for shutting off between the exhaust port and the resonance chamber through the sliding surface when the control valve moves backward.

According to a second aspect of the present invention, an exhaust timing control apparatus comprises a valve drive unit mounted on the cylinder block for driving the control valve in the forward and backward direction, a pressure passage provided in the cylinder block for introducing a combustion pressure in the cylinder into the valve drive unit, and a valve driving means for driving the control valve based on the combustion pressure.

Further, according to a third aspect of the present invention, an exhaust timing control apparatus has an improved valve drive unit. That is. the valve drive unit comprises a lower housing for slidably holding the control valve, an upper housing mounted on the lower housing, a diaphragm provided between the lower housing and the upper housing, a pressure chamber formed between the lower housing and the diaphragm to which the combustion pressure is introduced and an ambient air chamber formed between the diaphragm and the upper housing to which ambient air is introduced. The diaphragm has a first bead section on an inner periphery side thereof and the first bead section is pressed between a washer and a threaded member. Further, the diaphragm has a second bead section on an outer periphery side thereof and the second bead section is pressed between the outer periphery section of the lower housing and that of the upper housing. Further, the upper housing has a concave section for restricting an inflation of the diaphragm when the diaphragm is inflated by the combustion pressure.

DETAILED DESCRIPTION OF THE PREFERRED EMBODIMENT

Figure 1:
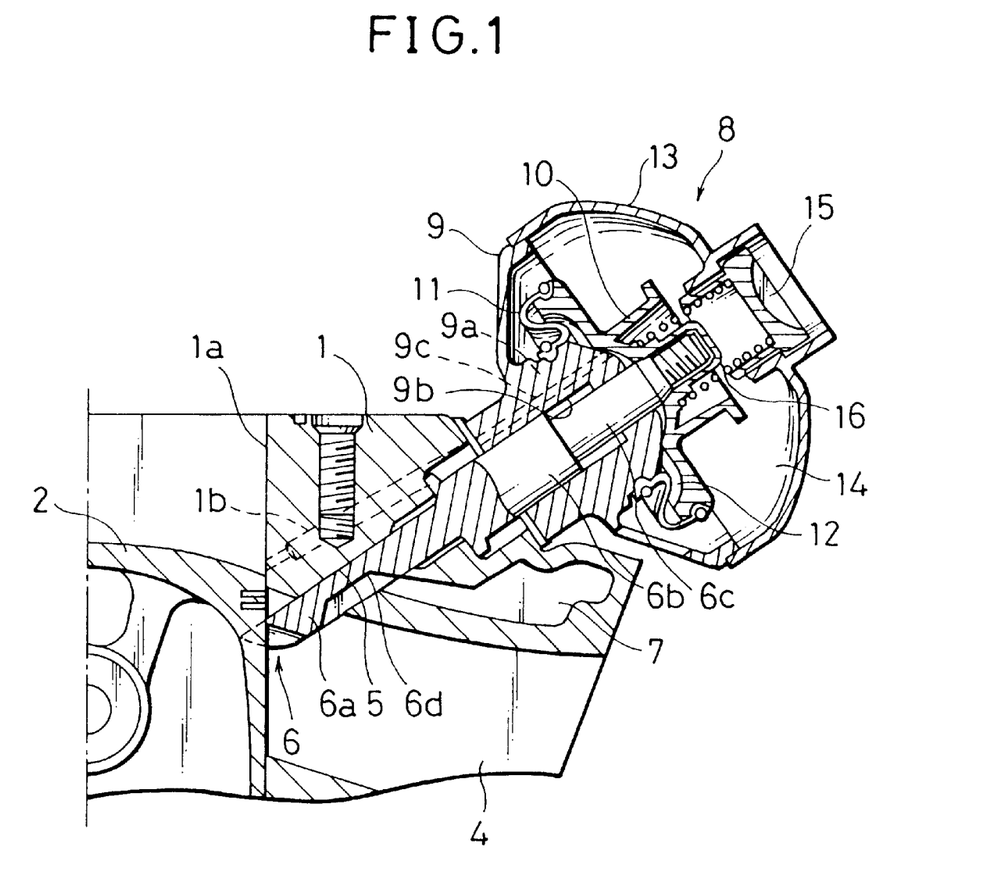
FIG. 1 is a cross sectional side view of an exhaust timing control apparatus under the condition of low engine speeds according to a first embodiment of the present invention.

Referring now to FIG. 1, reference numeral 1 denotes a cylinder block of a two-cycle engine, in which an exhaust port 4 opened and closed by a piston 2 is provided on a cylinder wall surface 1a of the cylinder block 1.

Further, a control valve 6 is accommodated in a valve accommodating section 5 which is provided in an upper wall section of the exhaust port 4 on the cylinder head side and a resonance chamber 7 is formed underneath the valve accommodating section 5.

Figure 3:
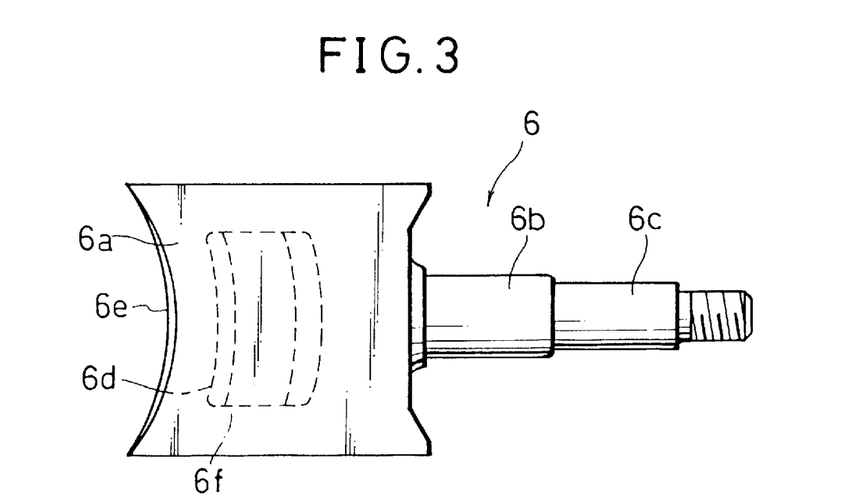
FIG. 3 is a plan view of a control valve body.

In this embodiment, the control valve 6 varies the exhaust timing by the forward and backward motion thereof in the direction of the cylinder inner wall surface 1a. The control valve 6, as shown in FIG. 3, comprises a plate-shaped valve body 6, a guide shaft 6b for guiding the motion of the valve body 6a and a small diameter section 6c which is formed into a smaller diameter than that of the guide shaft 6b. Further, a sliding surface 6f is formed on the bottom side of the valve body 6a. The tip of the valve body 6a is shaped into a concave section 6e with a curvature corresponding to the cylinder inner wall surface 1a and the end portion of the small diameter section 6c is threaded. The concave section 6e acts as a control surface for controlling the exhaust timing.

Further, there is provided a cavity 6d on the sliding surface 6f of the valve body 6a facing the resonance chamber 7. The cavity 6d communicates between the exhaust port 4 and the resonance chamber 7 when the valve body 6a is projected forward and the sliding surface 6f shuts off between the exhaust port 4 and the resonance chamber 7 when the valve body 6a goes backward.

The control valve 6 is driven by a valve drive unit 8 mounted on the cylinder block 1. The valve drive unit 8 comprises a cup-shaped lower housing 9, a boss 9a integrally formed in the center of the lower housing 9, a disk-like spring retainer 10, a diaphragm 11 provided between the boss 9a, the spring retainer 10, an upper housing 13 peripherally connected with the lower housing 9, a spring 16 held between the spring retainer 10 and the upper housing 13 and an adjusting screw 15.

The guide shaft 6b of the control valve 6 is slidably fitted to a guide hole 9b provided in the boss 9a. The end portion of the small diameter section 6c is threaded into the spring retainer 10.

Further, a pressure chamber 12 is provided between the diaphragm 11 and the spring retainer 10 and also an ambient air chamber 14 is formed between the diaphragm 11 and the upper housing 13.

The boss 9a has a pressure hole 9c for introducing the combustion pressure into the pressure chamber 12 through a pressure hole 1b provided in the cylinder block 1. The pressure hole 1b is exposed to the cylinder wall 1a and communicates with the pressure hole 9c so as to introduce the combustion pressure into the pressure chamber through the pressure holes 1b and 9c.

When the engine operates at low or medium speeds, since the combustion pressure in the cylinder is relatively low, the spring biasing force is larger than the combustion pressure introduced into the pressure chamber 12 of the valve drive unit 8 and the valve body 6a of the control valve 6 is projected obliquely toward the cylinder so as to move the upper edge of the exhaust port 4 downward, as shown in FIG. 1. As a result, the opening timing of the exhaust port 4 is retarded and the closure timing is advanced, thereby the short-circuiting phenomenon is prevented.

Then, since the cavity 6d of the valve body 6a is exposed from the open section of the valve accommodating section 5 to the exhaust port 4, the exhaust port 4 communicates with the resonance chamber 7 through the cavity 6d, thereby the pulsation of the exhaust gas is suppressed and the exhaust efficiency is improved at a low and medium speed range.

Figure 2:
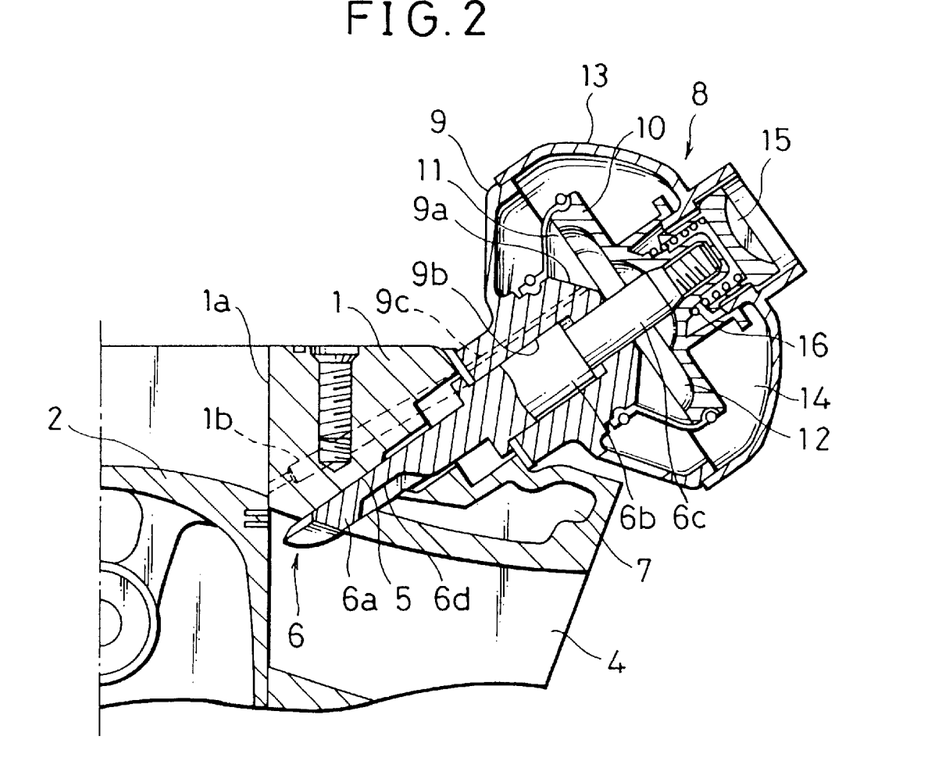
FIG. 2 is a cross sectional side view of an exhaust timing control apparatus under the condition of high engine speeds according to a first embodiment of the present invention.

When the engine operates at high speeds and the combustion pressure becomes relatively high, the combustion pressure introduced into the pressure chamber 12 is larger than the biasing force of the spring 16 and the valve body 6a of the control valve 6 goes back into the valve accommodating section 5, as shown in FIG. 2. As a result, the opening timing of the exhaust port 4 is advanced. At this moment, since the cavity 6d of the valve body 6a is accommodated within the valve accommodating section 5, the opening section of the valve accommodating section 5 is closed to shut down the communication between the exhaust port 4 and the resonance chamber 7. Further, since the exhaust port 4 is fully opened, the exhaust efficiency is improved at a high speed range.

Figure 4:
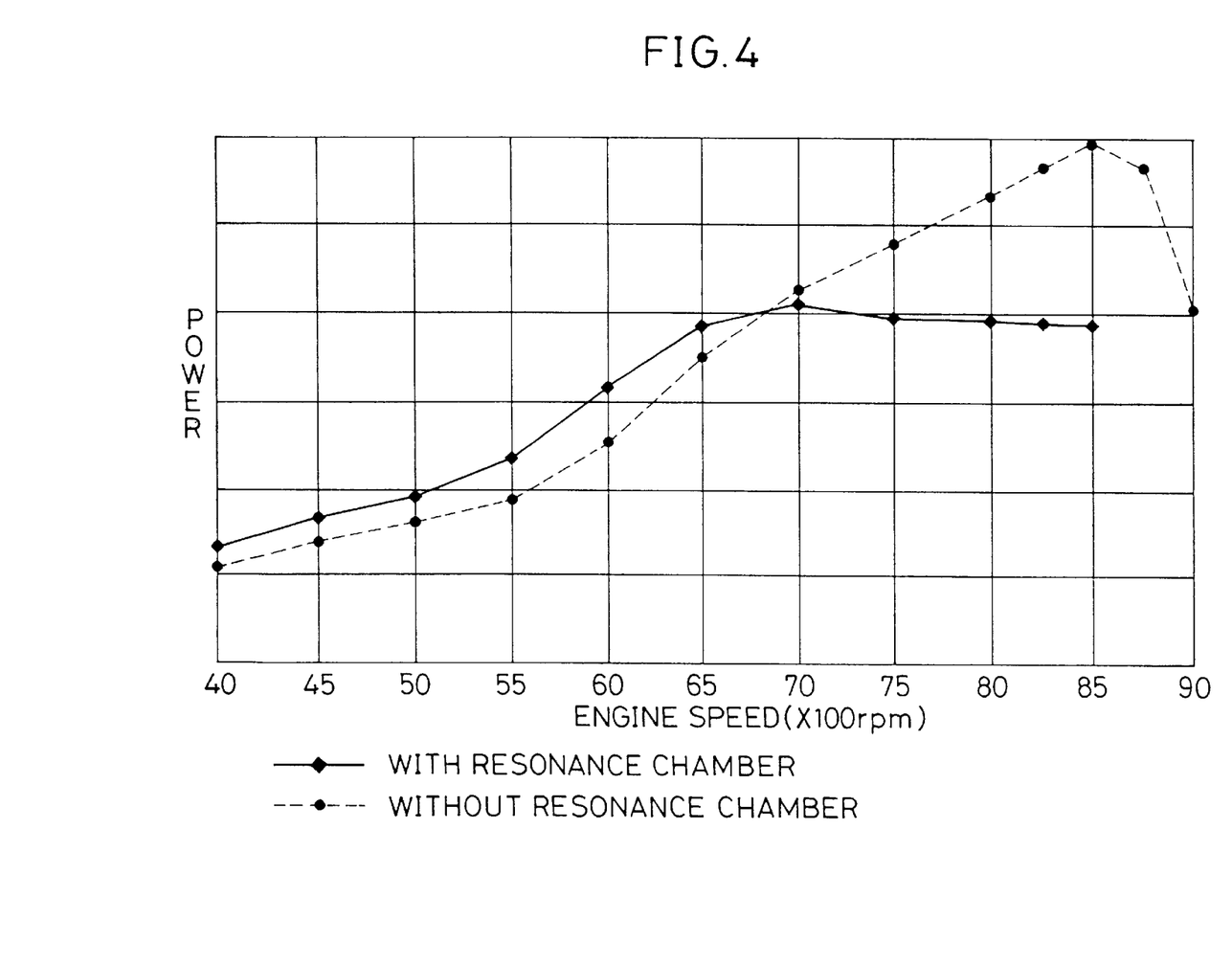
FIG. 4 is a diagram showing an effect of an exhaust resonance chamber.

FIG. 4 shows a result of experiments for investigating the effect of the resonance chamber. At the low and medium engine speed range lower than 7000 rpm, the engine power with the resonance chamber is larger than that without the resonance chamber. However, at the high engine speed range higher than 7000 rpm, the engine power with the resonance chamber stops an increase and inversely the engine power without the resonance chamber exceeds the engine power with the resonance chamber and successively increases.

Therefore, according to the first embodiment of the present invention, since the resonance chamber opens and closes in conjunction with the motion of the control valve, the engine power is held high from the low speed range to the high speed range.

Further, since the control valve is driven by use of the high combustion pressure in the cylinder, even when carbons stick to the valve body 6a or the sliding surface of the valve accommodating section 5, the control valve can be operated in a stable manner.

Figure 5:
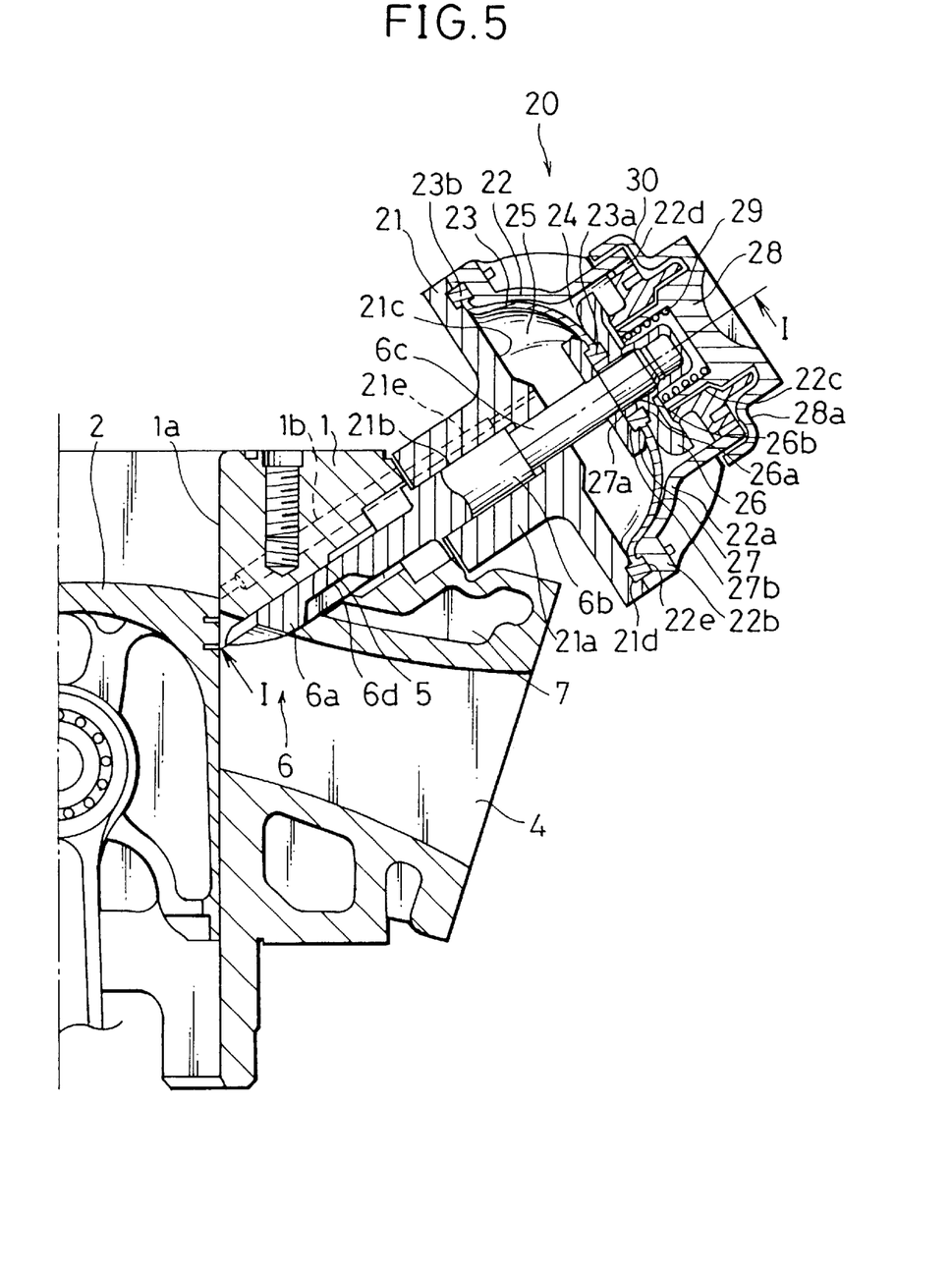
FIG. 5 is a cross sectional side view of an exhaust timing control apparatus under the condition of high engine speeds according to a second embodiment of the present invention.
Figure 6:
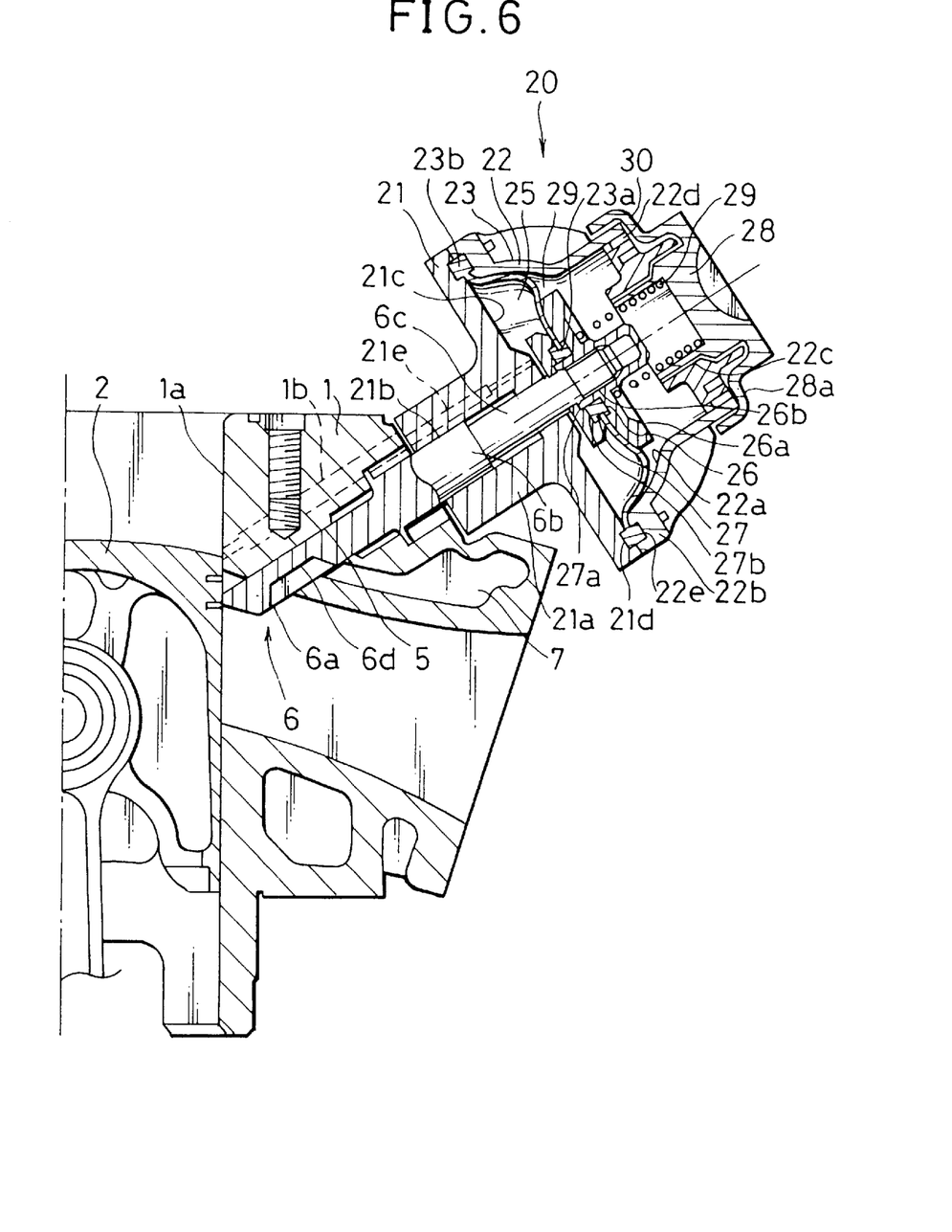
FIG. 6 is a cross sectional side view of an exhaust timing control apparatus under the condition of low engine speeds according to a second embodiment of the present invention.

FIGS. 5 and 6 show an improved exhaust timing control apparatus according to a second embodiment of the present invention. In the drawings, the components which are identical to those in the first embodiment are denoted by identical reference numerals and will not be described in detail.

Figure 8:
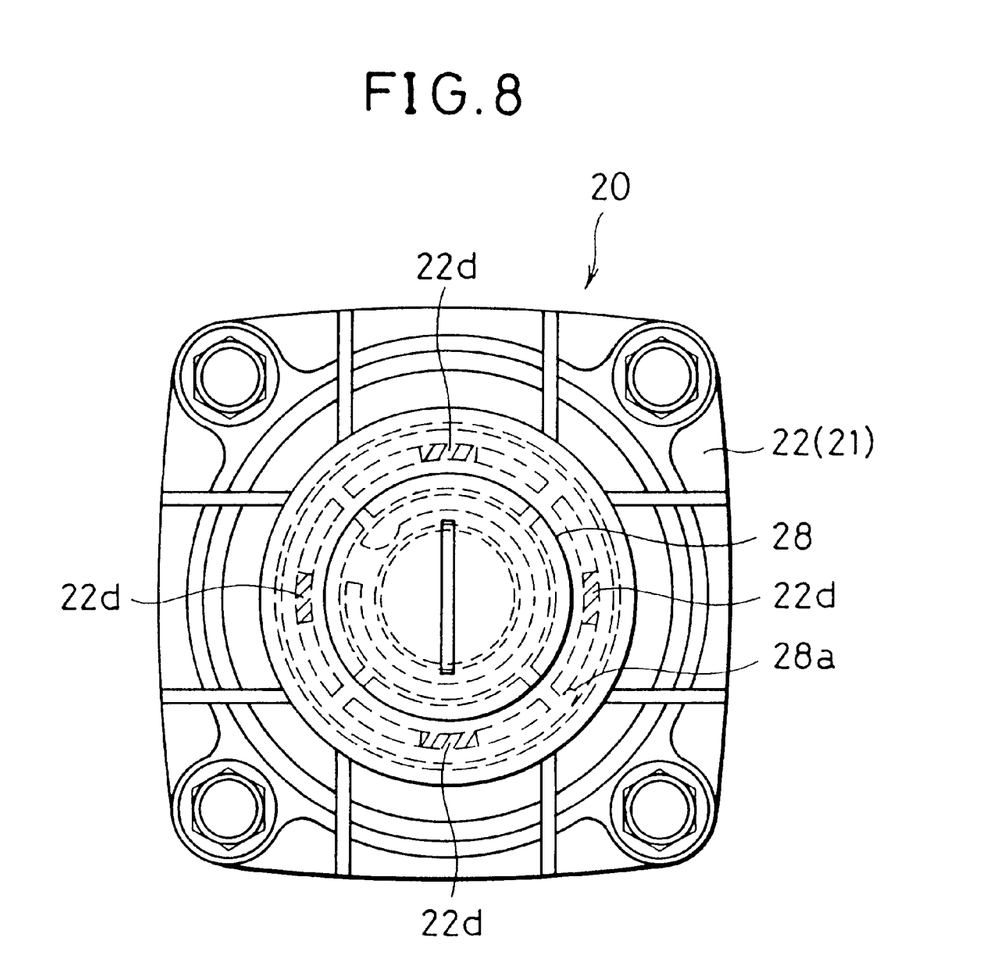
FIG. 8 is a top view of an exhaust timing control apparatus according to a second embodiment of the present invention.

The control valve 6 is driven by a valve drive unit 20 mounted on the cylinder block 1. The valve drive unit 20 comprises a lower housing 21, an upper housing 22 fastened to the lower housing 21 by bolts (see FIG. 8) and a diaphragm 23 provided between the lower housing 21 and the upper housing 22.

An ambient air chamber 24 is formed between the upper housing 22 and the diaphragm 23 and a pressure chamber 25 is formed between the lower housing 21 and the diaphragm 23. Further, a boss 21a is provided in the center of the lower housing 21.

The boss 21a has a guide hall 21b to which the guide shaft 6b is slidably fitted and the small diameter section 6c is projected from an upper surface 21c of the lower housing 21. Further, the end portion of the small diameter section 6c is threaded into a spring retainer 26 through a washer 27.

The upper housing 22 has a concave section 22a at the bottom thereof and a flange section 22b is peripherally formed at the open lower end of the concave section 22a. The upper housing 22 is mated with and fastened to the upper surface 21c of the lower housing 21 through the flange section 22b.

The upper case 22 has a threaded hole 22c at the upper end thereof and a plurality of air vents 22d are provided at a specified interval around the threaded hole 22c of the upper housing 22. The air vents 22d are for maintaining the pressure of the ambient air chamber 24 at an ambient pressure.

The diaphragm 23 is formed into a round shape along the concave section 22a of the upper housing 22. An open section is provided at the top of the diaphragm 23. Further, a bead section 23a is peripherally formed around the inner periphery of the open section and also a bead section 23b is peripherally formed around the outer periphery of the bottom of the diaphragm 23.

The bead section 23a is pressed between the washer 27 and the spring retainer 26 and the bead section 23b is pressed between the upper surface 21c of the lower housing 21 and the flange section 22b. As a result, the ambient air chamber 24 is separated by the diaphragm 23 and the portion enclosed by the diaphragm 23 and the upper surface 21c of the lower housing 21 is formed into the pressure chamber 25.

Describing the installation of the diaphragm 23 more in detail, there is provided a first annular sink 27a on the upper surface of the washer 27 along the inner periphery of the washer 27 and also there is provided a second annular sink 27b on the outer periphery of the first sink 27a.

On the other hand, there is provided an annular groove 26a on the bottom surface of the spring retainer 26 at the face-to-face position of the second sink 27b and a projection 26b is projected from the inner periphery of the groove 26a, being fitted to the first sink 27a.

Thus, the bead section 23a of the diaphragm 23 has a tight contact with the second sink 27b, the groove 26a and the projection 26b, a three-points sealing being accomplished.

Also, there is provided a groove 21d on the upper surface 21c at the portion adjacent to the outer periphery of the lower housing 21. Further, there is provided a groove 22e in the flange section 22b of the upper housing 22 at the face-to-face position of the groove 21d.

Accordingly, the bead section 23b of the diaphragm 23 has a tight contact with the groove 21d and the groove 22e, a two-points sealing being accomplished.

Figure 7:
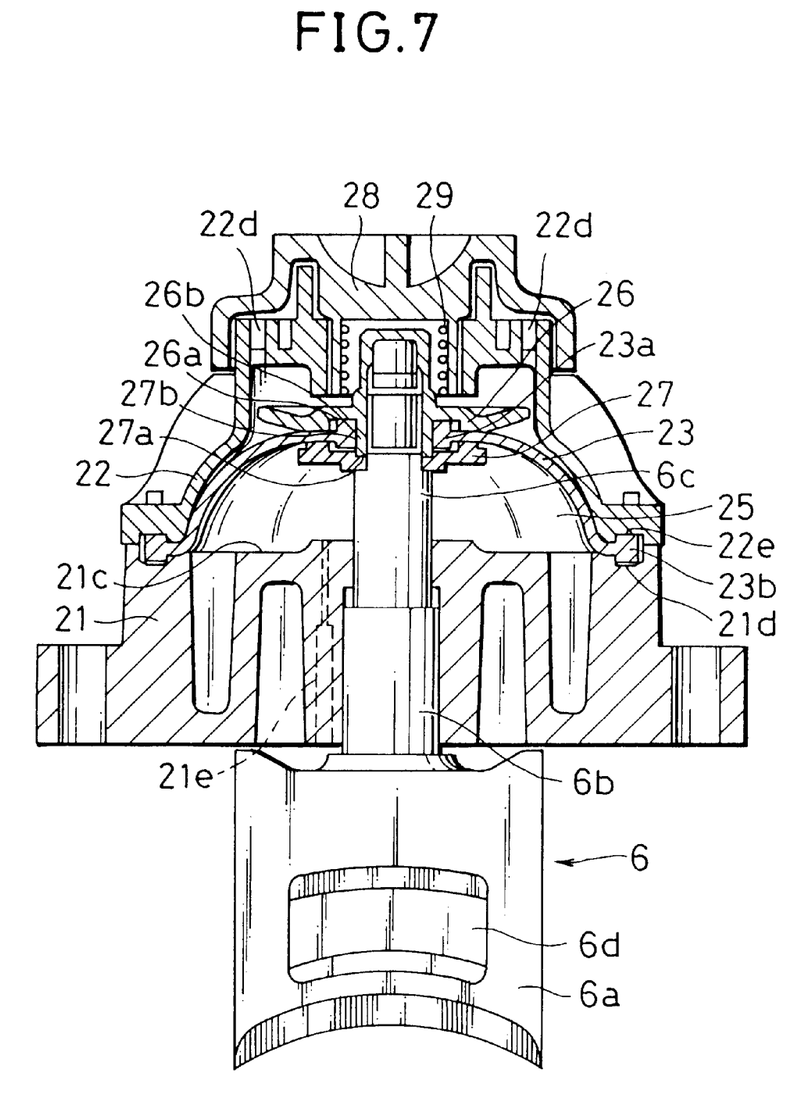
FIG. 7 is a cross sectional view taken along a line I—I.

As illustrated by broken lines in FIGS. 5 and 7, there is provided a pressure hole 21e communicating with the pressure chamber 25 in the boss 21a of the lower housing 21. The pressure hole 21e communicates with the pressure hole 1a provided in the cylinder block 1. The pressure hole 1b is exposed to the cylinder wall 1a so as to introduce the combustion pressure to the pressure chamber 25 through the pressure hole 21e of the lower housing 21.

Further, an adjusting screw 28 is threaded into the threaded hole 22c provided on the top center of the upper housing 22 and a spring 29 is provided between the adjusting screw 28 and the spring retainer 26 so as to apply the biasing force to the control valve 6 in the cylinder direction.

Further, the adjusting screw 28 has a skirt section 28a formed along the external configuration of the upper housing 22 and covering the upper housing 22 with a predetermined gap between when the adjusting screw 28 is threaded into the threaded hole 22c.

Thus, a labyrinth-like air passage 30 is formed between the upper housing 22 and the skirt section 28a of the adjusting screw 28 and therefore the air vent 22d communicates with outside air through the air passage 30.

In addition to the effects of the invention described in the first embodiment, according to the second embodiment, when the exhaust port 4 is fully open, the diaphragm 23 is pressed on the concave section 22a, thereby the excessive inflation of the diaphragm 23 which may cause a damage to the diaphragm 23 can be prevented.

Further, since the bead section 23a is pressed between the washer 27 and the spring retainer 26 and the bead section 23b is pressed between the upper surface 21c of the lower housing 21 and the flange section 23b, the sealing characteristic of the diaphragm 23 is improved, and as a result it is possible to prevent a leakage of exhaust gas or tar from the pressure chamber 25.

Further, the labyrinth-like air passage 30 provided between the skirt section 28a of the adjusting screw 28 and the upper housing 22, can prevent an invasion of rain or snow into the ambient air chamber 24. This also prevents the ambient air chamber 24 from icing under the low temperature condition.

While the presently preferred embodiments of the present invention have been shown and described, it is to be understood that these disclosures are for the purpose of illustration and that various changes and modifications may be made without departing from the scope of the invention as set forth in the appended claim.

What is claimed is:

1. An exhaust timing control apparatus for a two-cycle engine having a piston, a cylinder, a cylinder block, an exhaust port, comprising:

a valve accommodating section obliquely provided in said cylinder block;

a control valve inserted into said valve accommodating section and slidably moving forward and backward along a sliding surface having a cavity therein for changing an exhaust timing of said engine;

a resonance chamber provided in the vicinity of said valve accommodating section;

a valve drive unit mounted on said cylinder block for driving said control valve in the forward and backward direction; and a pressure passage provided in said cylinder block for introducing a combustion pressure in said cylinder into said valve drive unit;

wherein said cavity communicates between said exhaust port and said resonance chamber when said control valve moves forward, and said valve drive unit drives said control valve based on said combustion pressure.

2. The exhaust timing control apparatus according to claim 1, wherein said valve drive unit comprises a lower housing for slidably holding said control valve, an upper housing mounted on said lower housing, a diaphragm provided between said lower housing and said upper housing, a pressure chamber formed between said lower housing and said diaphragm to which said combustion pressure is introduced and an ambient air chamber formed between said diaphragm and said upper housing to which ambient air is introduced.

3. The exhaust timing control apparatus according to claim 2, wherein said diaphragm has a first bead section on an inner periphery side thereof and said first bead section is pressed between a washer and a threaded member.

4. The exhaust timing control apparatus according to claim 2, wherein
said diaphragm has a second bead section on an outer periphery side thereof and said second bead section is pressed between the outer periphery section of said lower housing and that of said upper housing.

5. The exhaust timing control apparatus according to claim 2, wherein
said upper housing has a concave section for restricting an inflation of said diaphragm when said diaphragm is inflated by said combustion pressure.

6. An exhaust timing control apparatus for a two-cycle engine having a piston, a cylinder, a cylinder block, an exhaust port, comprising:
a valve accommodating section provided in an upper wall section of said exhaust port;
a control valve mounted on said cylinder block for varying said exhaust timing by restricting said exhaust port by projecting toward said cylinder in said exhaust port from said valve accommodating section an d by opening said exhaust port by going back to said valve accommodating section;
a valve drive unit for driving said control valve to project from and go back into said valve accommodating section; and
a pressure passage provided in said cylinder block for introducing a combustion pressure in said cylinder into said valve drive unit;
wherein said valve drive unit drives said control valve based on said combustion pressure.

7. The exhaust timing control apparatus according to claim 6, wherein:
said valve drive unit comprises:
a lower housing for slidably holding said control valve;
an upper housing mounted on said lower housing;
a spring retainer threading an end portion of said control valve;
a diaphragm provided between said lower housing and said upper housing, and supported by said lower housing and said spring retainer;
adjusting screw threaded into said upper housing;
a spring held between said spring retainer and said adjusting screw;
a pressure chamber formed by said lower housing, said diaphragm and said spring retainer for introducing said combustion pressure through said pressure passage; and
an ambient air chamber formed between said diaphragm and said upper housing to which ambient air is introduced;
wherein said control valve projects toward said cylinder by a biasing force of said spring, and goes back into said accommodating section when said combustion pressure of said pressure chamber is larger than said biasing force of said spring.

8. The exhaust timing control apparatus according to claim 6, wherein:
said valve drive unit comprises:
a lower housing for slidably holding said control valve;
an upper housing mounted on said lower housing and;
a spring retainer threading an end portion of said control valve through a washer;
a diaphragm provided between said lower housing and said upper housing;
adjusting screw threaded into said upper housing;
a spring held between said spring retainer and said adjusting screw;
a pressure chamber formed by said lower housing, said diaphragm and said spring retainer for introducing said combustion pressure through said pressure passage; and
an ambient air chamber formed between said diaphragm and said upper housing to which ambient air is introduced;
wherein said control valve projects toward said cylinder by a biasing force of said spring, and goes back into said accommodating section when said combustion pressure of said pressure chamber is larger than said biasing force of said spring.

9. The exhaust timing control apparatus according to claim 8, wherein:
said diaphragm has an open section at the top thereof, a first bead section formed around the inner periphery of said open section, and a second bead section formed around the outer periphery of a bottom thereof.

10. The exhaust timing control apparatus according to claim 8, wherein:
said upper housing comprises;
a threaded hole at the upper end thereof for threading said adjusting screw;
a plurality of air vents provided at a specified interval around said threaded hole for maintaining a pressure of said ambient air chamber at an ambient pressure;
wherein said adjusting screw has a skirt section formed along the external configuration of said upper housing and covering said upper housing with a predetermined gap for providing an air passage to communicate said air vent with outside air.

11. An exhaust timing control apparatus for a two-cycle engine having a cylinder block with a cylinder surrounded by a cylinder inner wall surface, and a piston inserted in said cylinder for reciprocating therein and for generating a power to drive, said inner wall surface with an exhaust port closed and opened by said piston for delivering exhaust gases to outside of said engine and for controlling said power by a predetermined exhaust timing, comprising:
a resonance chamber formed in a vicinity of said exhaust port for inducing said exhaust gases therein in order to suppress a pulsation of exhaust gases;
a control valve body inserted in a hole formed in said cylinder block for controlling the introduction of said exhaust gases into said resonance chamber;
a valve drive unit mounted on said cylinder block for driving said control valve body; and
said cylinder block having a pressure passage formed therein for introducing a combustion pressure from said cylinder to said valve drive unit without passing through said exhaust port in order to open said control valve body for introducing said exhaust gases into said resonance chamber when said engine is being operated at a low speed so as to effectively suppress said pulsation and in order to close said control valve body for cutting off introducing said exhaust gases into said resonance chamber so as to effectively make use of said power in optimum conditions when said engine is being operated at relatively high speed.

12. The exhaust timing control apparatus according to claim 11, wherein:
said valve drive unit moves said control valve body to come closer to said cylinder for communicating said exhaust port with said resonance chamber at said low speed and to separate further from said cylinder for cutting off a communication between said exhaust port and said resonance chamber at said high speed in accordance with respective exhaust timings.

13. The exhaust timing control apparatus according to claim 11, further comprising:

a diaphragm provided in said valve drive unit and connected to said control valve body for actuating thereof in a direction of approaching said cylinder.

14. The exhaust timing control apparatus according to claim 13, further comprising:

a cap provided on said valve drive unit for covering thereof; and a passage with a maze shape formed in said cap for breathing air entrapped between said diaphragm and said valve drive unit so as to prevent water from entering therethrough resulting in icing in a cold weather and to ensure optimum operations of said engine.

\* \* \* \* \*